US010506047B2

(12) United States Patent
Yu et al.

(10) Patent No.: US 10,506,047 B2
(45) Date of Patent: Dec. 10, 2019

(54) DYNAMICALLY SUBSCRIBING TO MANAGEMENT INFORMATION AND METHOD AND SYSTEM FOR DISPENSING THEREOF

(75) Inventors: Qi Yu, Beijing (CN); Yu Zhang, Beijing (CN); Yi Xin Zhao, Beijing (CN); Huan Hao Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 837 days.

(21) Appl. No.: 13/455,427

(22) Filed: Apr. 25, 2012

(65) Prior Publication Data

US 2012/0303746 A1 Nov. 29, 2012

(30) Foreign Application Priority Data

Apr. 28, 2011 (CN) .......................... 2011 1 0116048

(51) Int. Cl.
*G06F 15/16* (2006.01)
*H04L 29/08* (2006.01)

(52) U.S. Cl.
CPC ............... *H04L 67/12* (2013.01); *Y04S 40/18* (2018.05)

(58) Field of Classification Search
CPC ............................... H04L 67/12; G06F 15/173
USPC ......... 707/203; 709/223, 238, 217; 717/171, 717/172, 173; 370/338, 401
See application file for complete search history.

(56) References Cited

U.S. PATENT DOCUMENTS 7,181,490 B1 * 2/2007 Harvey .................. H04L 67/26 709/203
7,254,579 B2 8/2007 Cabrera
7,406,537 B2 * 7/2008 Cullen ......................... 709/238
7,865,550 B2 1/2011 Lobban
8,588,194 B2 * 11/2013 Chen ...................... H04L 41/08 370/338
2002/0103866 A1 * 8/2002 Chi ........................ H04L 67/10 709/206
2004/0210653 A1 * 10/2004 Kanoor et al. ............... 709/223
(Continued)

FOREIGN PATENT DOCUMENTS

CN 1728091 A 2/2006
CN 101594372 A 12/2009
(Continued)

*Primary Examiner* — Backhean Tiv
*Assistant Examiner* — Ishrat Rashid
(74) *Attorney, Agent, or Firm* — Cantor Colburn LLP; Kevin Michael Jordan

(57) ABSTRACT

The present invention discloses a method and apparatus for dynamically subscribing to management information and a method and system for dispensing management information. According to the present invention, a management topic and a participant associated with the management topic may be dynamically determined, and the management topic may be subscribed to for the determined participant. Therefore, it is possible to sufficiently utilize a publish/subscribe mechanism in dispensing management information in a case where the intelligence of the managed device is unequal to the intelligence of the managing device, thereby avoiding creation and utilization of an additional management channel and significantly reducing the complexity and management cost of the system.

10 Claims, 8 Drawing Sheets

(56) References Cited

U.S. PATENT DOCUMENTS

| | | | | |
|---|---|---|---|---|
| 2006/0026972 | A1* | 2/2006 | Masui | F24F 11/30 62/127 |
| 2006/0235942 | A1* | 10/2006 | Gale | H04L 67/2838 709/217 |
| 2007/0283001 | A1* | 12/2007 | Spiess | H04L 43/00 709/224 |
| 2012/0143981 | A1* | 6/2012 | Ku | H04L 67/12 709/217 |

FOREIGN PATENT DOCUMENTS

| | | | |
|---|---|---|---|
| CN | 101848236 | A | 9/2010 |
| CN | 101854338 | A | 10/2010 |
| CN | 101930656 | A | 12/2010 |
| CN | 102007495 | A | 4/2011 |

* cited by examiner

DYNAMICALLY SUBSCRIBING TO MANAGEMENT INFORMATION AND METHOD AND SYSTEM FOR DISPENSING THEREOF

FIELD OF THE INVENTION

Embodiments of the present invention generally relate to application of publish/subscribe mechanism in, for example, an Internet of Things, and more particularly, to a method and apparatus for dynamically subscribing to management information and a method and system for dispensing management information.

BACKGROUND

The Internet of Things (IOT) is an interconnection communication network between things that is implemented with merging technologies of sensor, computer, communication network and semiconductor. It may be widely applied to various detecting and monitoring fields, such as smart grid, logistics, natural resource monitoring/management, smart city.

For the sake of illustration, FIG. 1 illustrates an exemplary system architecture of IOT in the prior art. As illustrated in FIG. 1, the IOT 100 generally comprises three layers, i.e., a sensing layer 110, a network layer 120, and an application layer 130. The sensing layer 110 is designed to detect, monitor, and sense things and generally comprises various sensors 111, 112, 114, such as sensor, pick-up head, RF tag, and etc. It also comprises actuators 113, 115 such as a switch, or a gate, wherein some devices may also function as a sensor and an actuator simultaneously. A device at the sensing layer 110 is accessed to a wide area network 123 through a sensor network 116, 117 via, for example, an access device 121, 122 in the network layer 120, so as to transmit the sense information via the wide area network 123. The sense information is transmitted to the application layer 130 through the wide area network 123 via the application gateway 124. The application layer 130 may comprise a plurality of applications 131, 132, 133, 134, for storing, mining, processing, and applying the sense information that is transmitted via the network layer. The applications 131, 132, 133, and 134 in the application layer 130 may also provide, based on this information, management information to the actuator in the sensing layer so as to perform various management functions.

In the IOT system, a topic-based publish/subscribe mechanism may be employed. The publish/subscribe is a message-oriented message paradigm; it is used to enable multi-to-multi communication and can implement decoupling between a message publisher and a message receiver. For the sake of illustration, FIG. 2 schematically illustrates a principle architecture of a publish/subscribe mechanism. In FIG. 2, application nodes for different classes of messages are denoted by various symbols such as a diamond, a round, a triangle, an asterisk, etc. As illustrated in FIG. 2, a central node 210 is set between these application nodes. On one hand, an application as a message publisher directly publishes the message that is required by the message publisher itself to publish to the central node 210, with the publish topic being labeled, regardless of who is the receiver of the message. On the other hand, an application, which is the message receiver, subscribes to a message class that is required by the application itself from the central node 210 based on the topic, regardless of who is the message publisher. In such a way, when the central node 210 receives a message, it will push the message to one or more applications that have subscribed to this message class based on the subscription relationship. Thus, with this publish/subscribe mechanism, decoupling or loose coupling may be realized between the publisher and subscriber, which may allow a better scalability and more dynamic network topology. Besides, in this system architecture, the central node 210, for example, may be implemented via a message broker, such as WebSphere Message Broker by IBM™, SQL-Server by Microsoft™, open sourced AcitiveMQ and Mosquitto, and etc.

However, it has been found that there are some problems in applying the publish/subscribe mechanism to the IOT system. As previously mentioned, the sensing layer in the IOT system comprises actuators. An upper-layer application is always required to send some management messages to one or more particular actuators so as to perform a corresponding management operation on the actuator. However, these actuators are usually only some common executing devices, such as a switch, a gate, etc. They are often less intelligent and thus not suitable for a publish/subscribe mechanism where each application has a substantially equal intelligence. On the other hand, these actuators are only some simple executing devices, and it would be unrealistic to design them to have a higher intelligence, because it will significantly increase the system cost. Therefore, during dispensing the downlink management information, such actuators cannot obtain the corresponding management information based on the publish/subscribe mechanism.

In the prior art, in order to solve this problem, a dedicated management channel is designed for the downlink, where like a traditional information transmission technology, the upper-layer application is still required to know the addresses of respective actuators so as to dispense the management information to the corresponding actuators. Thus, in the existing IOT, there are actually two sets of information transmission mechanism, namely, a publish/subscribe mechanism for uplink information transmission and a traditional information transmission mechanism for downlink dispensing management information. Therefore, only the uplink information transmission can advantageously utilize the publish/subscribe mechanism, while unlike the uplink information transmission, the downlink management information transmission cannot realize the decoupling between the message publisher and receiver. Additionally, existence of the two mechanisms further brings about multiple problems in aspects of cost, management, maintenance and etc.

SUMMARY

Thus, it is needed to provide a technical solution for improving the downlink management information transmission so as to overcome or at least partially eliminate the defects in the prior art.

In one embodiment of the present invention, there is provided a method of dynamically subscribing to management information. The method comprises: parsing published management information to determine management object information; creating and publishing a participation call notification about the management topic that is associated with the management object information; determining a participant of the management topic based on the management object information and the pre-established device property information, and subscribing to the management object for the participant.

In another embodiment of the present invention, subscribing to the management topic for the participant comprises: subscribing to the management topic and designating an addressing mechanism that is associated with the participant.

In a further embodiment of the present invention, the method further comprises: converting the management information into a management command that can be supported by the participant.

In a still further embodiment of the present invention, the method further comprises: publishing the management instruction to the management topic.

In a yet further embodiment of the present invention, there is provided a method of dispensing management information. The method comprises: steps as mentioned in the method of subscribing to management information in the preceding embodiments, and dispensing the management information to a determined participant based on the subscription.

In a further embodiment of the present invention, there is provided an apparatus for dynamically subscribing to management information. The apparatus comprises: management information parsing means configured to parse published management information so as to determine management object information; a call notification publication means configured to create and publish a participation call notification about the management topic that is associated with the management object information; participant determination means configured to determine a participant of the management topic based on the management object information and the pre-established device property information, and management topic subscription means configured to subscribe to the management object for the participant.

In a still further embodiment of the present invention, there is provided a system for dispensing management information. The system comprises: the apparatus for subscribing to management information as mentioned in the preceding embodiments, and a message broker configured to dispense management information to a determined participant based on the subscription.

In a further embodiment, there is provided a computer program product. The computer program product is embodied with computer program code, which, when running on a device, enables the apparatus to perform the steps of a method of subscribing to management information as mentioned in the abovementioned embodiments.

In a yet further embodiment, there is provided a computer program product. The computer program product is embodied with computer program code, which, when running on a device, enables the apparatus to perform the steps of a method of dispensing management information as mentioned in the abovementioned embodiments.

According to the present invention, a management topic and a participant associated with the management topic may be dynamically determined, and the management topic may be subscribed to for the determined participant. Therefore, it is possible to sufficiently utilize a publish/subscribe mechanism in dispensing management information in a case where the intelligence of the managed device is unequal to the intelligence of the managing device (namely, the managed device has less or no intelligence), thereby realizing decoupling or loose coupling between the information publisher and the information receiver. In this way, use of additional management channels may be avoided, thereby further significantly reducing the complexity and management cost of the system.

BRIEF DESCRIPTION OF THE DRAWINGS

The above and other features of the present invention will become more apparent through detailed description of the embodiments as illustrated with reference to the accompanying drawings. Like reference signs indicate like or similar components through the accompanying drawings of the present invention, wherein, FIG. 1 schematically illustrates a system architecture of IOT.

DETAILED DESCRIPTION

Figure 1:
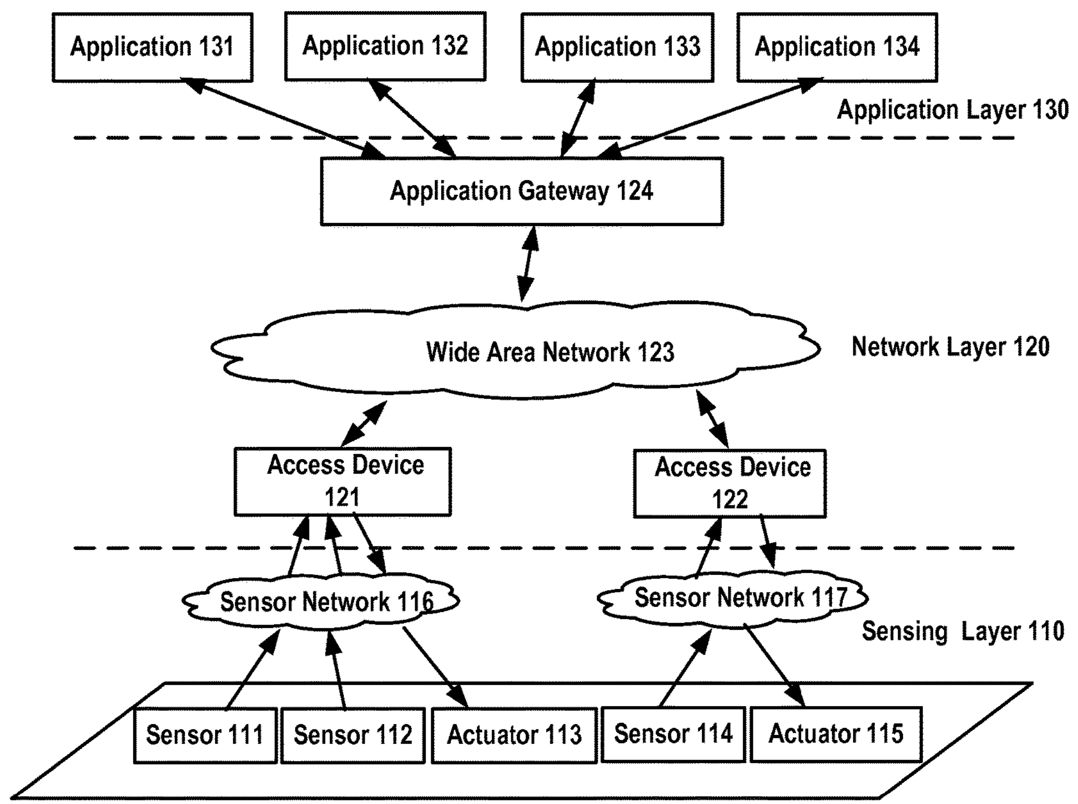
Figure 2:
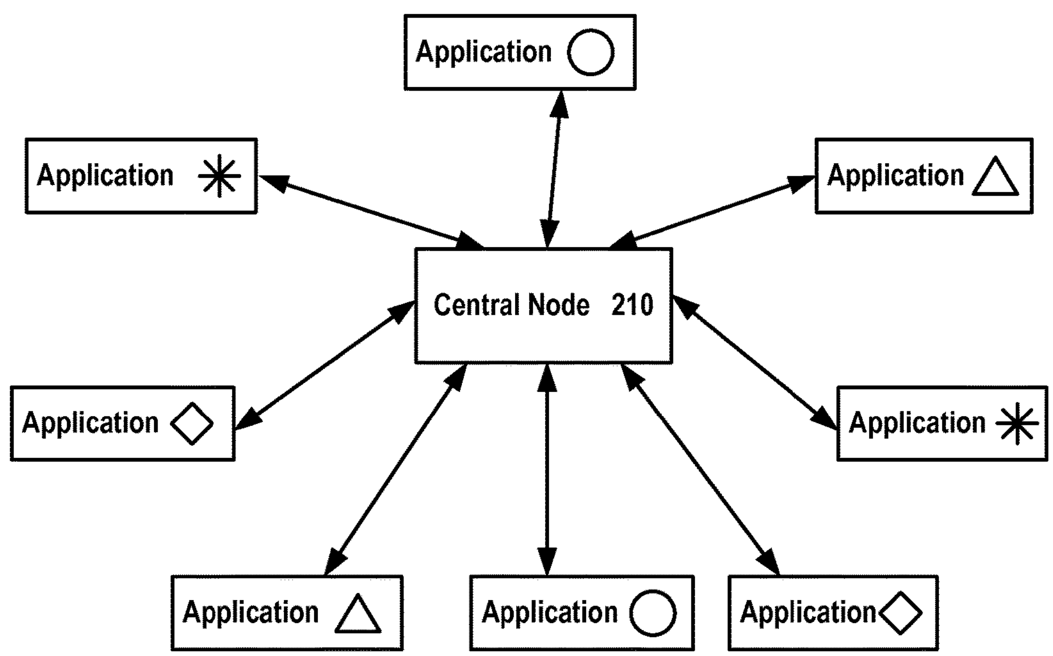
FIG. 2 schematically illustrates a principle architecture of a publish/subscribe mechanism.

Hereinafter, the method and apparatus for dynamically subscribing to management information, and the method and system for dispensing management information according to the present invention will be described in detail through the embodiments with reference to the accompanying drawings. The flowcharts and block diagrams in the drawings illustrate the system, methods, as well as architecture, functions and operations which can be implemented by a computer program product according to the embodiments of the present invention. In this regard, each block in the flowcharts or block diagrams may represent a module, a program segment, or a part of code, which contains one or more executable instructions for performing specified logic functions. It should also be noted that in some alternative implementations, functions indicated in blocks may occur in an order different from the order as illustrated in the figures. For example, two blocks illustrated consecutively may be performed in parallel substantially or sometimes be performed in an inverse order, which depends on relevant functions. It should also be noted that each block in the block diagrams and/or flowcharts and a combination of blocks in the block diagrams and/or flowcharts may be implemented by a dedicated hardware-based system for performing specified functions or operations or by a combination of the dedicated hardware and computer instructions.

Figure 3:
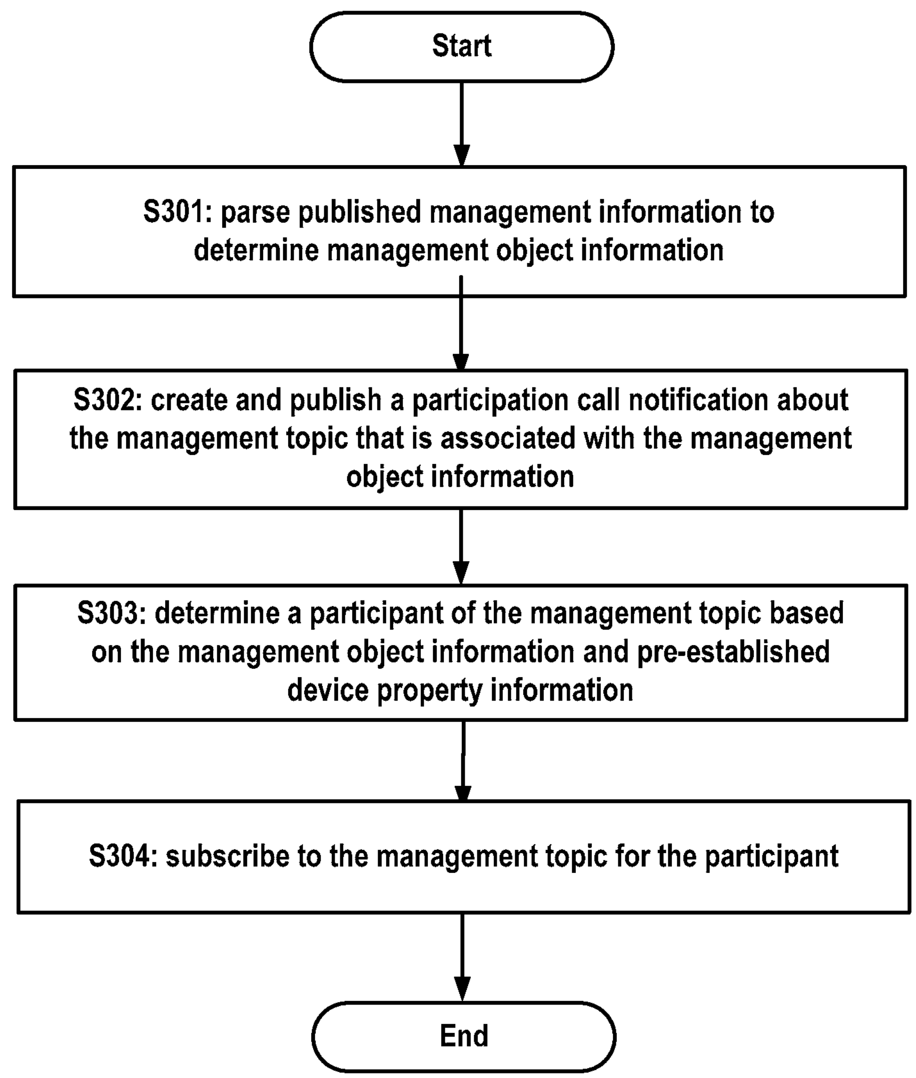
FIG. 3 schematically illustrates a flow chart of a method of dynamically subscribing to management information according to an embodiment of the present invention.

Next, reference will be made to FIG. 3, which schematically illustrates a flow chart of a method of subscribing to management information according to one embodiment of the present invention. As illustrated in FIG. 3, first at step S301, published management information is parsed to determine the management object information.

When an upper-layer application publishes management information to the message broker via the application server, the management information may be obtained, and the published management information may be parsed to obtain management object information associated with the management information. Usually, the published management information comprises management operation and management object information so as to indicate what management operations is performed on which objects (or within which scope). Thus, for example, by parsing the management information in terms of a predetermined management information format or in any other suitable manner, information such as the management operation and management object of the management information may be extracted.

The operation corresponding to this step may be performed, as a part of the operations of the message broker, in the message broker. However, considering the compatibility with the existing message broker in the system, the operation in this step is preferably executed independently of the message broker. In this case, it is required to subscribe in advance or subscribe by default to the management information class such that the message broker pushes the management information that is published by the upper-layer application to the component that implements operations corresponding to this step. Therefore, correspondingly, this method may comprise receiving management information so as to perform the parsing operation thereon.

Next, at step S302, a participation call notification may be published about the management topic associated with the management object information. The management topic may be formed based on, for example, the management action and the management object. For example, "Second Floor Air Conditioner Control," wherein "Control" indicates the management action or management action type, while "Second Floor Air Conditioner" indicates a management object. However, it should be noted that this management action is not necessary. Actually, when determining the management topic, it may be based on a fixed or default management action or management action type, for example, the management topic may be directly determined as "Second Floor Air Conditioner Management" or "Second Floor Air Conditioner Operation" based on the previously mentioned management object "Second Floor Air Conditioner." Additionally, more other additional information may be parsed as required in certain application.

Further, it should be noted that naming of the management topic may be independent of the management object and management action, and, instead, an implicit association relationship is established between the management topic and the management object information. For example, the management topic may be named as "M1234" which is associated with "Second Floor Air Conditioner." However, it is preferable to generate a management topic based on the management object information, because it is more intuitive and is also easy for implementation.

Next, as illustrated in FIG. 3, at step S303, a participant of the management topic may be determined based on the management object information and the device property information.

Pre-established property information may be stored at a position where the message broker is located or at any suitable location that enables data communication therewith. The device property information comprises information on the properties of a device in the system, such as device identity, device type, installation location, associated application, and etc., and may be stored in a plurality of manners such as in a database, data table or configuration document. Furthermore, alternatively, it may establish, for various device types, corresponding device property information. Therefore, based on such device property information and the management object information as determined at step S301, the participants associated with the management topic, namely various devices that need to be managed, may be determined by means like searching, querying.

The management object information used in determining the participant may be obtained in various manners. For example, the management object information may be obtained by direct communication or through a publish/subscribe mechanism. Additionally, because the operations of steps S301 and S302 may be implemented in a same environment, for the sake of saving the system resources, it is preferable to deliver the manage object information and management topic and the like by direct communication therebetween.

It should be noted that in order to make the expressions more accurate herein, terms "management object," "participant," "managed device" are used. Particularly, the term "management object" is used with respect to the management instruction, which refers to the object as indicated in the management instruction, for example, "Second Floor Air Conditioner"; the term "participant" is used with respect to a participation call notification about the management topic, which indicates a specific device that is to participate in the participation call on the management topic, and it is determined through the management object information and the device property information, for example, the air conditioners with device IDs 3, 4, and 6; while in other general context, the term "managed device" is used. Actually, the determined participant is the specific device that needs being managed.

Additionally, similarly to step S301, the operation corresponding to step 303 may be performed, as a part of the operations of the message broker, in the message broker. However, considering the compatibility with the existing message broker, it is preferable to perform independently of the message broker. The operations corresponding to steps S301 and S303 may be performed in a same component or by two separate components based on functional differences.

Next, at step S304, the management topic may be subscribed to for the determined participant. After determining the participants of the management topic, it can subscribe to the management topic from the message broker on the behalf of the participant, such that the message broker may pull the management information relating to this management topic to the corresponding participant. The subscription may comprise a step of subscribing to the management topic and registering a subscriber, where the subscriber is a pseudo-subscriber, because the subscriber is designated as an addressing mechanism associated with the participants. The subscription mechanism of each device may be prestored in the device property information, such that the addressing mechanism of the corresponding participant may be obtained from the device property information. However, the present invention is not limited thereto. The addressing mechanism may be individually stored in a dedicated addressing mechanism information table.

Additionally, the management information generally comprises a corresponding management operation. The present invention may also preferably comprise a step of converting the management information, such that the management information is converted into a management instruction that is comprehensible to the managed device (i.e., supported by the device). It may be implemented, for example, through a conversion table. Afterwards, the converted management instruction may be published to the corresponding management topic. In this way, the message broker may dispense, based on the subscription, corresponding commands based on the addressing mechanism of each participant to each participant.

In the embodiments according to the present invention, the management information may be one or more of a management command, a control command, or a configuration command, wherein the management command, for example, comprises failure management, backup management, update management, etc., the control command, for example, comprises the control on operations of a device and the running state of the device, and the configuration command, for example, comprises setting and changing various parameters of a device.

According to the above embodiments of present invention, a management topic and a participant associated with the management topic may be dynamically determined, and the management topic may be subscribed to for the determined participant. Therefore, it is possible to sufficiently utilize a publish/subscribe mechanism in dispensing management information in a case where the intelligence of the managed device is unequal to the intelligence of the managing device (namely, the managed device has less or no intelligence), thereby realizing decoupling or loose coupling between the information publisher and the information receiver. In this way, use of additional management channels may be avoided, thereby further significantly reducing the complexity and management cost of the system.

Hereinafter, the present invention will be introduced in more detail with reference to an exemplary application scenario and according to a data flow diagram of one preferred embodiment of the present invention.

Figure 4:
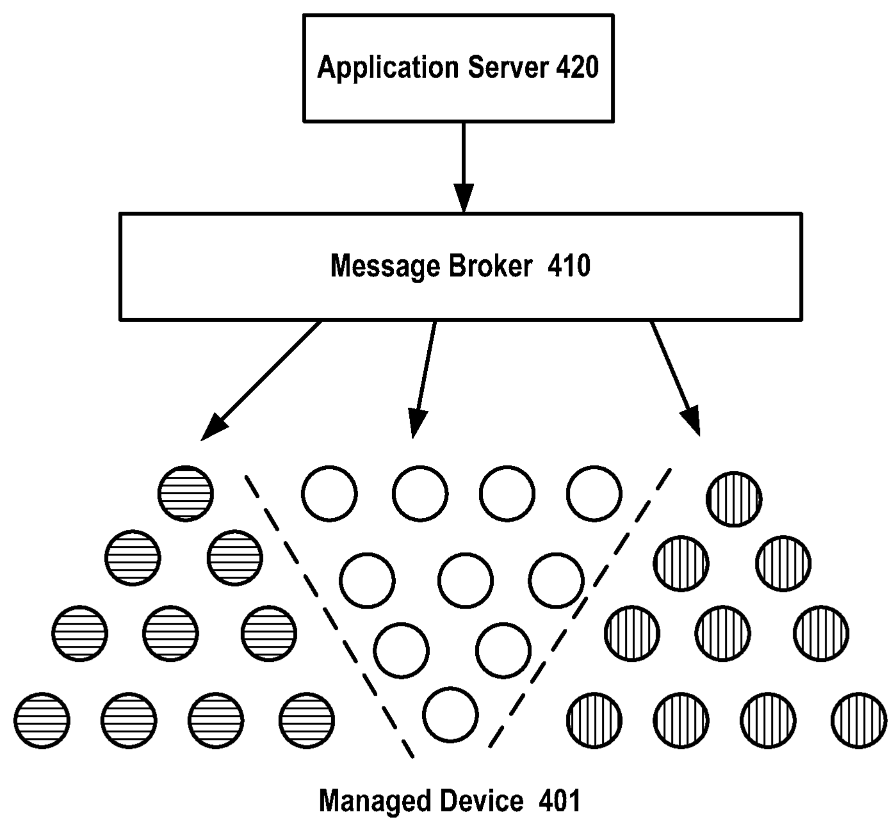
FIG. 4 schematically illustrates an exemplary application scenario according to the present invention.

As illustrated in FIG. 4, FIG. 4 schematically illustrates an exemplary application scenario according to the present invention. As illustrated in FIG. 4, the application server 420 is one that serves a particular application. This application configuration is for managing managed devices 401 at different locations. The managed devices 401 are, for example, air conditioners and located in different floors inside a building, for example, on the 1st floor, 2nd floor, and 3rd floor. This application is, for example, "Smart_Building_Application," which is one of many applications at the application layer of the IOT system.

Figure 5:
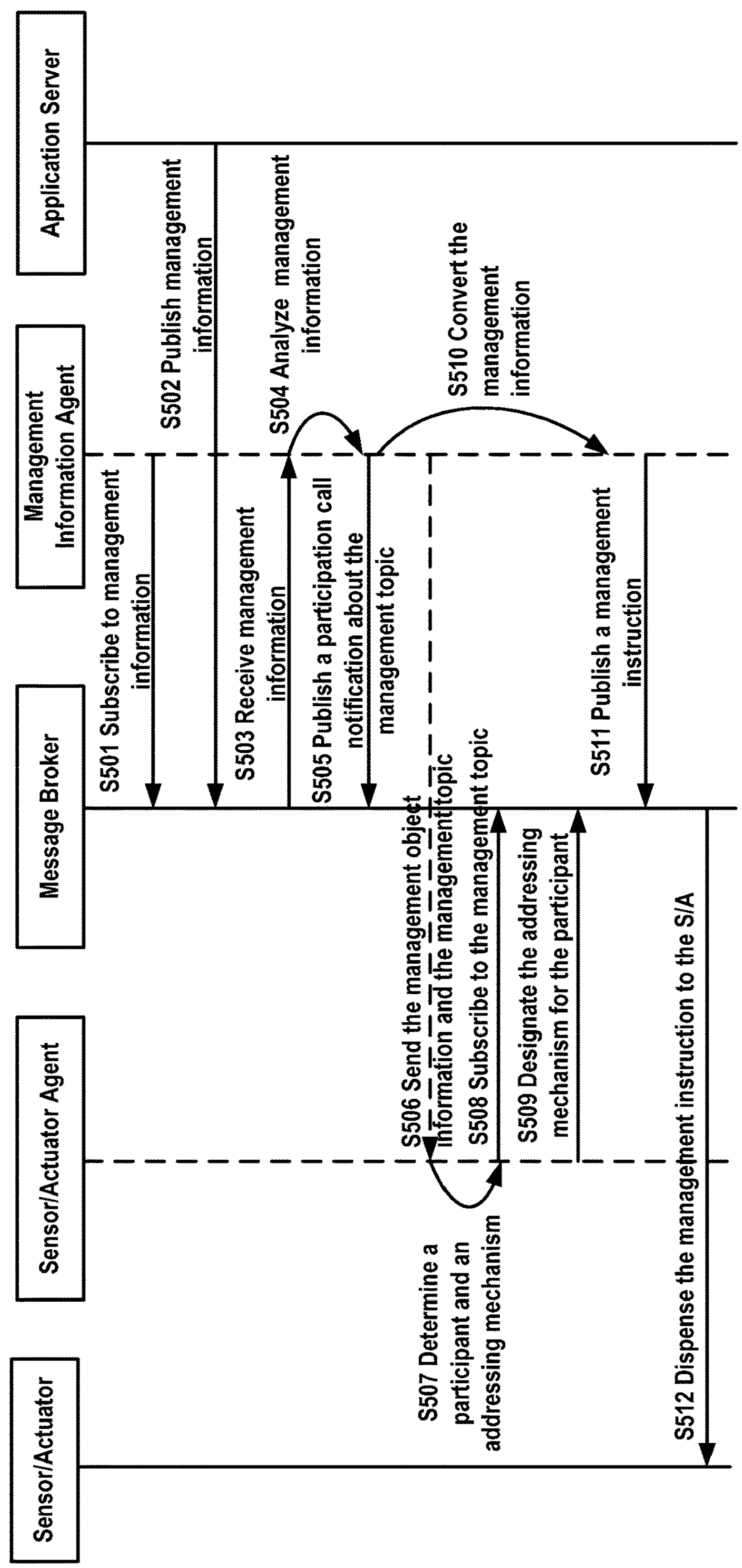
FIG. 5 illustrates a data flow diagram of a method of publishing management information according to one embodiment of the present invention.

FIG. 5 illustrates a data flow diagram of a method of dispensing management information according to embodiments of the present invention, comprising steps of the method of subscribing to management information. In the embodiment of FIG. 5, various operation steps of the method of the present invention are performed respectively by two individual components, i.e., sensor/actuator (S/A) agent and management information agent, which are independent of the message broker.

As illustrated in FIG. 5, first at step S501, the management information agent subscribes to the information of management information class from the message broker. However, as described above, it may be default that the management information agency has subscribed to the message on management information class.

Next, if the upper-layer application Smart_Building_Application finds based on the sense information that the temperature on the second floor has reached a predetermined value and determines to switch off the air conditioners in the second floor, management information will be published to the message broker by application server at step S502 so as to control the switching off of the air conditioners in the second floor. For the sake of illustration, an example of management message is provided as below.

The Example of Management Message:

```
Topic: Management          // Topic: management information.
Topic_Content:             // Topic content:
Action: Shutdown           //Action: shutdown.
Device: Air_Condition      //Device: air conditioner.
Floor: 2                   //Floor: 2.
Scope: All                 // Scope: all
```

Because the management information agent has subscribed to the management information class, the management information agent will receive the management information that is pushed by the message broker based on the subscription relationship. Because the application layer comprises several applications, for the purpose of distinguishing, the management information that is pushed to the management information agent may additionally comprise an application-related information. However, it should be noted that it is not necessary in the case of only having one application or in the case of different applications managing different types of devices. The management information that is dispensed to the management information agent, for example, may be expressed below:

Example of the Management Message as Received by the Management Information Agent:

```
Topic: Management                   //Topic management information
Topic_Content:                       //Topic content:
    Application: Smart_Building_Applicatoin //Application: smart
building application
    Action: Shutdown                     //Action: shutdown.
    Device: Air _Condition                //Device: air conditioner.
    Floor: 2                              //Floor: 2
    Scope: All                            //Scope: all
```

After receiving the management information that is pushed by the message broker, the management information agent may store the management information and directly parses the management information at step S504.

For example, it may be parsed based on the predetermined management information format. For example, it may be determined based on the Device tag and Floor tag that the management object information is "Air_Condition" at "floor 2." Additionally, when the device name after the tag "Device" is an abstract name and it is difficult to parse its specific meaning, the device type may also be determined based on the associated application, for example, if this application is a building air conditioner control application, then it may be determined that the control object is air conditioner. Further, there is also a case where the specific management object information cannot be identified merely from the device name after the tag "Device." At this point, further identification may be performed by virtue of the Application. For example, if the associated application merely manages the air conditioner of Tower A of the building, then the management object should be air conditioner at the second floor of Tower A. Based on the teaching here, those skilled in the art may determine the management object information as required by different applications based on management information parsing, which will not be detailed here.

Next, at step S505, a participation call notification about the management topic associated with the management object information may be published. As previously mentioned, naming of the management topic may be determined based on the management object information or independent thereof, which will not affect the essence of the present invention. The participation call notification about the management topic may be exemplarily presented below:

Example of the Management Topic for a Participation Call Notification as Published:

```
Topic: Air_Condition_Control              //Topic: air conditioner control
Topic_Content:                            //Topic content:
    Application: Smart_Building_Applicatoin //Application: smart
building application
    Device: Air_Condition                  //Device: air conditioner.
    Floor: 2                               //Floor: 2
    Scope: All                             // Scope: all.
```

The S/A agent responsible for building control may obtain the management object information and management topic from the management information agent by means of direct communication at step S506. Of course, this information may also be obtained through a publish/subscribe mechanism. The obtained management object information, for example, may be expressed below:

DeviceAttribute1: DeviceType==Air_Condition

DeviceAttribute2: Location==2

DeviceAttribute3:

Associated_Application==Smart_Building

Additionally, as previously mentioned, the device property table may be stored in the position where the message broker is located, where the S/A agent may access, or at any other suitable location. For the sake of illustration, an example of an air conditioner configuration table in a device property table is provided below.

TABLE 1

Air Conditioner Configuration Table

| Device ID | Device location | Associated application | Routing & addressing function |
|---|---|---|---|
| 1 | 1 | Smart_Building | new_air_condition_control(ID, switch) |
| 2 | 1 | Smart_Data_Center | old_air_condition_control(ID, switch) |
| 3 | 2 | Smart_Building | new_air_condition_control(ID, switch) |
| 4 | 2 | Smart_Building | old_air_condition_control(ID, switch) |
| 5 | 2 | Smart_Data_Center | new_air_condition_control(ID, switch) |
| 6 | 2 | Smart_Building | new_air_condition_control(ID, switch) |
| 7 | 2 | Smart_Data_Center | old_air_condition_control(ID, switch) |
| 8 | 3 | Smart_Building | new_air_condition_control(ID, switch) |

As illustrated in Table 1, the air conditioner deployment table comprises: device ID, device location, associated application, and addressing & routing mechanism, and among others. Additionally, it is known that different types of devices have different addressing & routing mechanisms. Those skilled in the art may determine different types of addressing & routing mechanism based on different types of applications. Thus, for the sake of simplicity, the addressing mechanism of each device is described into different function manners. The parameter "ID" indicates the device ID, while the parameter "switch" indicates a control action. With such addressing mechanism, it may be realized to perform corresponding control action to a corresponding device.

At step S507, the air conditioner deployment table is queried based on the management object information, and it may be found that the air conditioners with device IDs of 3, 4, and 6 are control objects, namely the participants of the management topic, and the corresponding addressing mechanisms may be obtained.

Then, the S/A agent may subscribe to the management topic at step S508, which, for example, may be implemented through the following command.

Example of a Message for Subscribing a Management Topic:

Subscribe_Topic: 2F_Air_Condition_Control

However, it should be noted that the management topic may also be subscribed to immediately after receiving the management topic and management object.

Next, the subscriber may be registered through designating the addressing & routing mechanism of each participant at step S509, which, for example, may be implemented through the following registering message.

Example of the Message of Registering a Subscriber:

Subscriber: new_air_condition_control(3, switch), Interested_Topic:

2F_Air_Condition_Control

Subscriber: old_air_condition_control(4, switch), Interested_Topic:

2F_Air_Condition_Control

Subscriber: new_air_condition_control(6, switch), Interested_Topic:

2F_Air_Condition_Control

The "Interested_Topic: 2F_Air_Condition_Control" in the registering message indicates that the unknown parameter "switch" is associated with the information of the topic "2F_Air_Condition_Control."

On the other hand, after the management information pushed by the message broker is received at step S503, the conversion operation may be performed on the management information at S510, so as to convert it into a management instruction that is comprehensible to the participants (or managed devices). Generally, the management information comprises a management action, while the management action of the upper-layer application is usually incomprehensible to the managed devices. Thus, it may be preferable to convert the management information, for example, based on the conversion table, so as to obtain a management instruction that is comprehensible to the managed devices (participants). Then, the converted management instruction may be published at step S511. For the sake of illustration, an example of converted management information is provided as below.

Example of Publishing a Converted Management Instruction:

Topic: 2F_Air_Condition_Control

Topic_Content: OFF

In this way, the message broker may dispense, based on the subscription relationship, the corresponding Topic_Content to the corresponding subscriber, i.e., air conditioners with device IDs 3, 4, and 6, by a message dispensing command (for example, dispense Command to S/A) at step S511.

It actually implements granting values to the parameters of the addressing & routing function, namely, deriving:
new_air_condition_control(3, OFF)
old_air_condition_control(4, OFF)
new_air_condition_control(6, OFF).

In this way, based on the function call, the off action to the air conditioners 3, 4, and 6 may be implemented, thereby realizing the control operations as desired by the Smart_Building_Application.

It should be noted that the above embodiments as described with reference to FIGS. 4 and 5 are only provided for the purpose of examples, and the present invention is not limited thereto; instead, various corresponding changes may be performed in dependency on the actual application.

The management information has been described above mainly with control commands as examples. However, the present invention is not limited thereto, and the management information may further comprise a management command, a configuration command, and other operation commands that comprise operation objects.

The present invention has been described mainly with reference to the Internet of Things IOT system. However, it should be noted that the present invention is not limited thereto. Actually, the present invention may also be applied to any publish/subscribe mechanism-based system where the intelligences between nodes are not equal (namely, the managed device has less or no intelligence).

Besides, the present invention is mainly described based on the management information that comprises a management object and management action. Actually, the present invention may be applied to any downlink management information transmission that comprises object information.

In another embodiment of the present invention, there is further provided a method of dispensing management information, comprising the method of subscribing to management information according to any of the preceding embodiments and the steps of dispensing the management information based on the subscription.

Figure 6A:
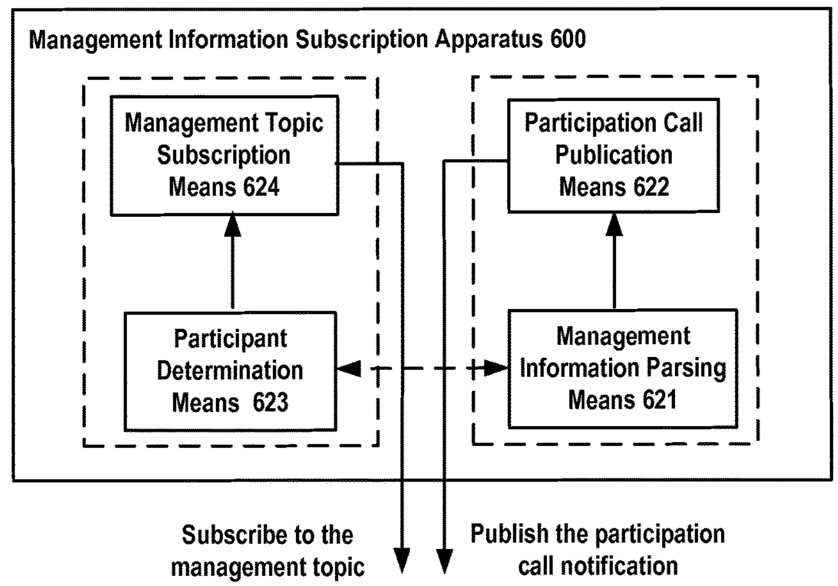
FIG. 6A illustrates a block diagram of an apparatus for dynamically subscribing to management information according to one embodiment of the present invention.
Figure 6B:
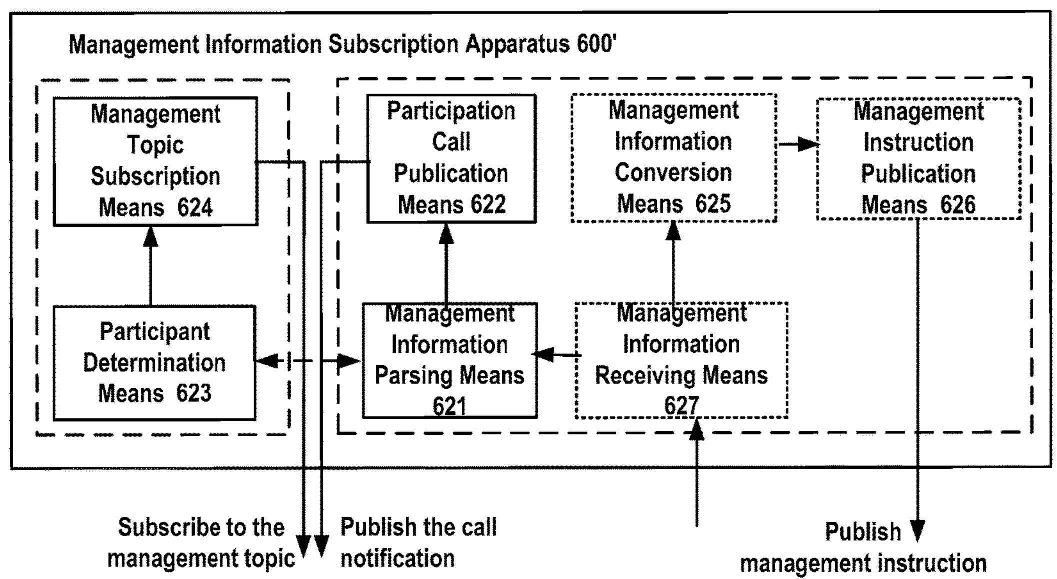
FIG. 6B illustrates a block diagram of an apparatus for dynamically subscribing to management information according to another embodiment of the present invention.

Hereinafter, an apparatus for dynamically subscribing to management information will be described with reference to FIGS. 6A and 6B, wherein FIGS. 6A and 6B illustrate a block diagram of an apparatus for dynamically subscribing to the management information according to one embodiment of the present invention.

As illustrated in FIG. 6A, a management information subscription apparatus 600 comprises management information parsing means 621 configured to parse published management information so as to determine management object information; participation call publication means 622 configured to publish a participation call notification about a management topic that is associated with the management object information; participant determination means 623 configured to determine a participant of the management topic based on the management object information and device property information; and management topic subscription means 624 configured to subscribe to a management topic for the participant.

With the above management information subscription apparatus, the management topic and the participant associated with the management topic may be dynamically determined, and the management topic may be subscribed to for the determined participant. Therefore, it is possible to sufficiently utilize a publish/subscribe mechanism in dispensing management information when the intelligence of the managed device is unequal to the intelligence of the managing device, thereby realizing decoupling or loose coupling between the information publisher and the information receiver. In this way, use of additional management channels may be avoided, thereby further significantly reducing the complexity and management cost of the system.

Besides, in preferred embodiments of the present invention, the management topic subscription means 624 is further configured to subscribe to the management topic; and to designate an addressing mechanism associated with the participant.

In another embodiment of the present invention, the addressing mechanism associated with the participant is obtained from the device property information.

In a further embodiment of the present invention, the management information comprises one or more of management command, control command, and configuration command directed to a specific device.

In another embodiment of the present invention, the management information subscription apparatus is operated in an IOT system.

FIG. 6B further illustrates a block diagram of a management information subscription apparatus 600' according to a preferred embodiment of the present invention. As illustrated in FIG. 6B, besides the component as illustrated in FIG. 6A, the management information subscription apparatus 600' further comprises: management information conversion means 625 configured to convert the management information into a management command that is comprehensible to the participant.

According to a further embodiment of the present invention, the management information subscription apparatus 600' further comprises management instruction publication means 626 configured to publish the management instruction to the management topic.

In a yet further embodiment of the present invention, the management information class is pre-subscribed to or subscribed to by default, and the management information subscription apparatus 600' further comprises: management information receiving means 627 configured to receive management information for being parsed.

Additionally, as previously mentioned, the management information subscription apparatuses 600 and 600' according to the present invention may be incorporated into the message broker as a part thereof. It is feasible for a system that is being developed. However, many applications already exist currently. Out of the consideration of factors such as costs and saving resources, in order to enable the existing applications to play their roles, the management information subscription apparatuses 600 and 600' according to the present invention preferably operate independently of the message broker but capable of communicating therewith.

Additionally, as previously mentioned, various means 621-627 as comprised in the management information subscription apparatuses 600 and 600' may be implemented in a separate component or by, for example, two different components based on the functions. One component therein (as illustrated with dotted frames at the left sides of FIGS. 6A and 6B) corresponds to the S/A agent as previously mentioned and may comprise participant determination means 622 and management topic subscription means 623; another component (as illustrated with dotted frames at the right sides of FIGS. 6A and 6B) corresponds to the management information agent as previously mentioned and may comprise management information parsing means 621, participation call publication means 622, management information conversion means 625, management instruction publication means 626, and management information receiving means 627.

Figure 7:
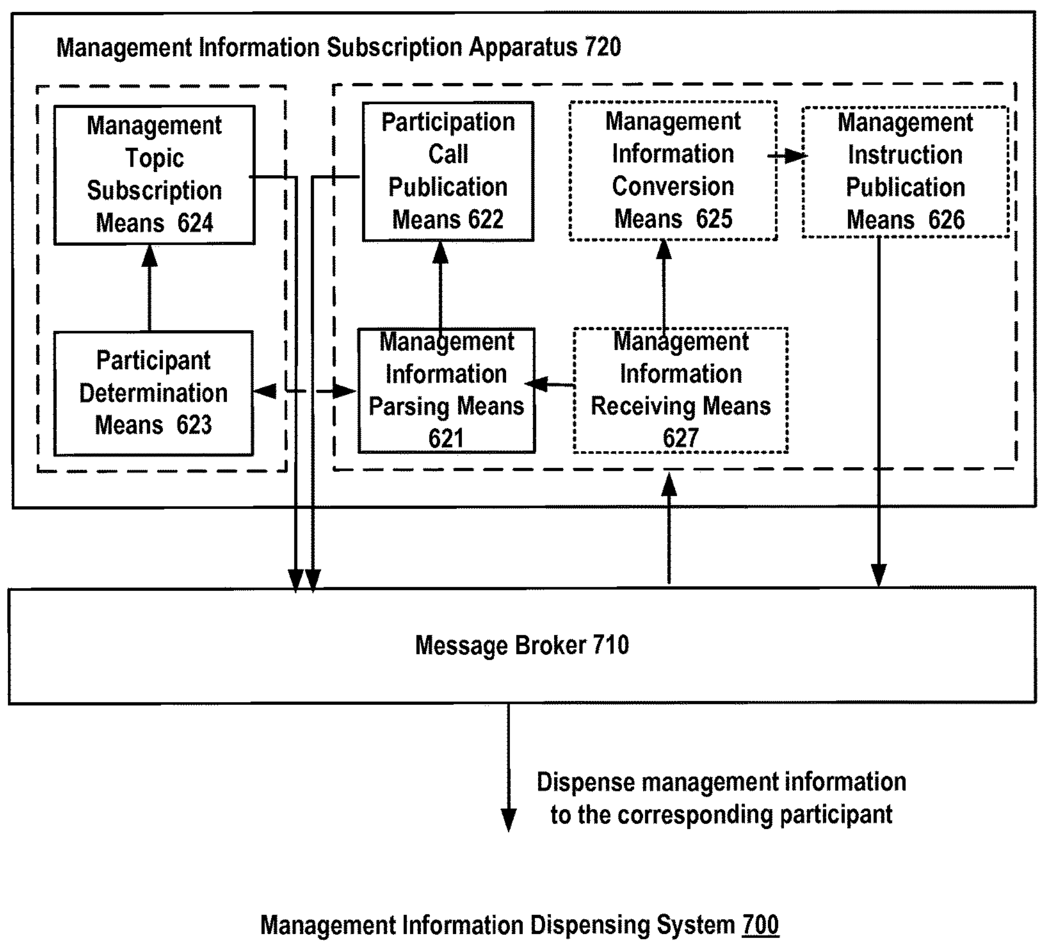
FIG. 7 illustrates a block diagram of a system for publishing management information according to one embodiment of the present invention, the system comprising an apparatus for subscribing to management information as provided by the present invention.

Additionally, FIG. 7 further illustrates a management information dispensing system 700 according to one preferred embodiment of the present invention. As illustrated in FIG. 7, the management information dispensing system 700 comprises a message broker 710 and a management information subscription apparatus 720. In this embodiment, the message broker 710 is configured to dispense the management information to the corresponding participant based on the subscription made by the management information subscription apparatus 720, while the management information subscription apparatus 720 subscribes to a management topic for a participant of the management topic according to the method of subscribing to management information of the present invention.

It should be noted that the management information subscription apparatus 720 as illustrated in FIG. 7 corresponds to the apparatus 600' as illustrated in FIG. 6B, however, the present invention is not limited thereto. Those skilled in the art should be clear that besides the apparatus as illustrated in FIG. 6B, the management information subscription apparatus 720 may also correspond to the management information subscription apparatus 600 according to any embodiment as previously illustrated with reference to FIG. 6A.

Further, it should be noted that the operations of various components of the management information subscription apparatuses 600 and 600' and the management information dispensing system 700 as described with reference to FIG. 6A, FIG. 6B and FIG. 7 substantially correspond to the operations of various steps of the methods as described above. Thus, for details about the specific operations of these components, please refer to the detailed depiction on the methods of the present invention as described above with reference to FIGS. 3 to 5.

Figure 8:
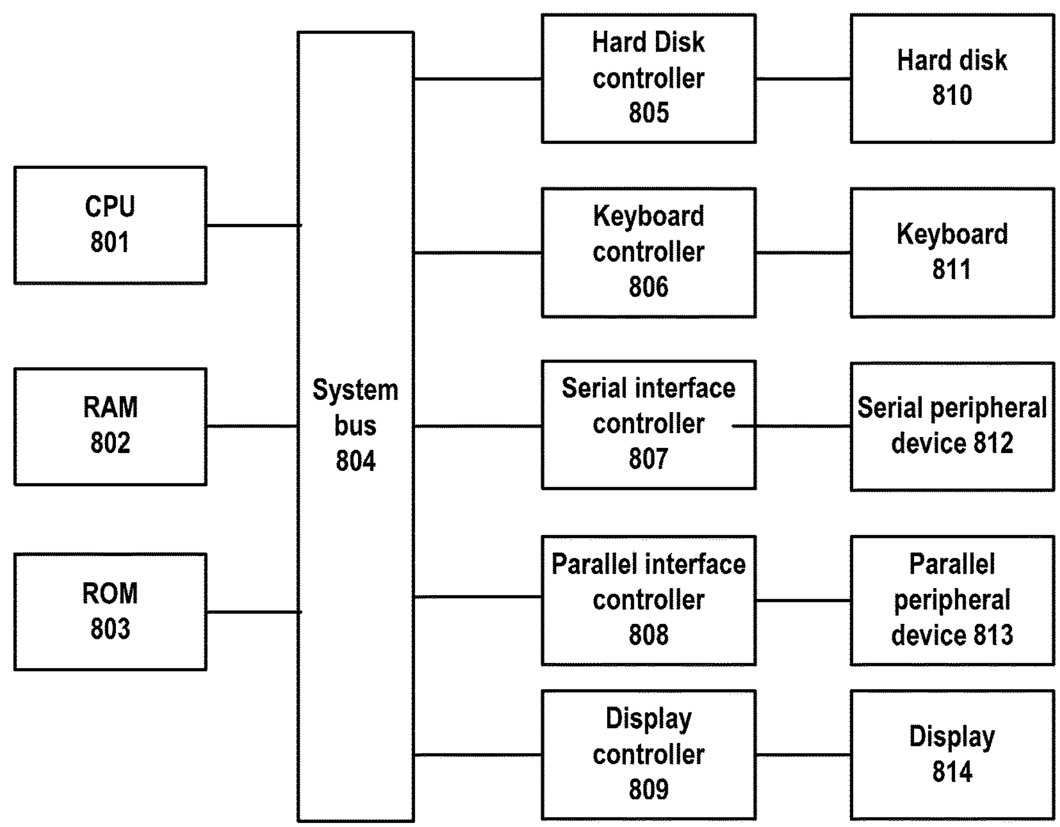
FIG. 8 schematically illustrates a structural block diagram of a computer device that may implement embodiments according to the present invention.

Hereinafter, a computer device capable of implementing the present invention will be described with reference to FIG. 8. FIG. 8 illustrates a structural block diagram of a computer device that may implement embodiments according to the present invention.

As illustrated in FIG. 8, the computer system comprises a CPU (Central Processing Unit) 801, a RAM (Random Access Memory) 802, a ROM (Read Only Memory) 803, a system bus 804, a hard disk controller 805, a keyboard controller 806, a serial interface controller 807, a parallel interface controller 808, a display controller 809, a hard disk 810, a keyboard 811, a serial peripheral device 812, a parallel peripheral device 813 and a display monitor 814. Among these components, connected to the system bus 804 are the CPU 801, the RAM 802, the ROM 803, the hard disk controller 805, the keyboard controller 806, the serial interface controller 807, the parallel controller 808 and the display controller 809. The hard disk 810 is connected to the hard disk controller 805; the keyboard 811 is connected to the keyboard controller 806; the serial peripheral device 812 is connected to the serial interface controller 807; the parallel peripheral device 813 is connected to the parallel interface controller 808; and the monitor 814 is connected to the monitor controller 809. The structural block diagram in FIG. 8 is illustrated only for the purpose of illustration, and is not intended to limit the invention. In some cases, some devices can be added or reduced as required.

The present invention may adopt a form of fully hardware embodiment, or an embodiment comprising both hardware components and software components. In a preferred embodiment, the present invention is implemented as software, including, without limitation to, firmware, resident software, micro-code, etc. Moreover, the present invention may take a form of a computer program product accessible by computer-usable or computer-readable media which provide program code for use by or in connection with a computer or any instruction executing system. For the purpose of description, a computer-usable or computer-readable medium may be any tangible means that can contain, store, communicate, propagate, or transmit the program for use by or in connection with an instruction execution system, apparatus, or device. The medium may be an electric, magnetic, optical, electromagnetic, infrared, or semiconductor system (apparatus or device). Examples of the computer-readable medium would include: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory and a mass memory, usable during actually executing the program code, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently usable network adapter.

It is to be understood from the foregoing description that modifications, alterations and combinations may be made to the respective embodiments of the present invention without departing from the true spirit of the present invention. The description in the present specification is intended to be illustrative and not limiting. The scope of the present invention is limited by the appended claims only.

What is claimed is:

1. A method of dynamically subscribing a participant managed device to management information, comprising:

a management information agent subscribing, via a message broker, to a management information class;

the management information agent receiving, via a management information receiving module, published management information from one or more application servers through the message broker, wherein the received published management information corresponds to a received downlink management information transmission;

the management information agent parsing, via a management information parsing module, published management information received to determine management object information, wherein the parsing is based on a predetermined management information format;

the management information agent generating a management topic based on determined management object information;

the management information agent creating and publishing, via a participation call publication module, a participation call notification about the management topic that is associated with the management object information;

a sensor/actuator agent determining a participant managed device of the management topic based on the management object information and pre-established device property information, the pre-established device property information comprising addressing and routing mechanisms of the participant managed device, wherein the participant managed device comprises an air conditioner device and the addressing and routing mechanisms of the participant managed device comprise a function including a device ID parameter and a control action parameter;

the sensor/actuator agent subscribing, via a management topic subscription module, to the management topic on behalf of the participant managed device;

the sensor/actuator agent registering the subscribed participant managed device by designating the addressing and routing mechanism of the participant managed device;

the management information agent converting, via a management information conversion module, the management information into a management instruction that can be implemented by the participant managed device;

the management information agent publishing, via a management instruction publication module, the management instruction to the management topic, wherein the management instruction comprises an air conditioning device control command; and dispensing, via the message broker, the management information to the participant managed device subscribed.

2. The method according to claim 1, wherein the addressing mechanism that is associated with the participant managed device is obtained from the device property information.

3. The method according to claim 1, wherein the management information comprises one or more of a management command, a control command, and a configuration command directed to a specific device.

4. The method according to claim 1, wherein the method is implemented in an Internet of Things system.

5. A managing computing apparatus for dynamically subscribing a participant managed device to a management topic to obtain management information, comprising:

one or more distinct software modules, each of the one or more distinct software modules being embodied on a tangible computer-readable storage medium, and wherein the one or more distinct software modules comprise:

a management information parsing module, a participation call publisher module, a participation determination module, and a management topic subscription module executing on a hardware processor, wherein the management information parsing module parses published management information so as to determine management object information, wherein the published management information corresponds to a downlink management information transmission and parsing is based on a predetermined management information format;

the participation call publishing module generates a management topic based on determined management object information and creates and publishes a participation call notification about the management topic that is associated with the management object information;

the participant determination module determines a participant managed device of the management topic based on the management object information and pre-established device property information, the pre-established device property information comprising addressing and routing mechanisms of the participant managed device, wherein the participant managed device comprises an air conditioner device and the addressing and routing mechanisms of the participant managed device comprise a function including a device ID parameter and a control action parameter;

a management information conversion module configured to convert the management information into a management instruction that can be supported by the participant managed device;

a management instruction publication module configured to publish the management instruction to the management topic, wherein the management instruction comprises an air conditioning device control command and the management topic subscription module subscribes to the management topic on behalf of the participant managed device and registers the subscribed participant managed device by designating the addressing and routing mechanism of the participant managed device.

6. The managing computing apparatus according to claim 5, wherein the addressing mechanism that is associated with the participant managed device-is obtained from the device property information.

7. The managing computing apparatus according to claim 5, wherein the management information comprises one or more of a management command, a control command, and a configuration command directed to a specific device.

8. The managing computing apparatus according to claim 5, wherein the managing computing apparatus is operated in an Internet of Things system.

9. A non-transitory computer program storage medium storing computer executable instructions for causing a computer to perform a method of dynamically subscribing a participant managed device to a management topic to obtain management information, wherein the method comprises:

a management information agent subscribing, via a message broker, to a management information class;

the management information agent receiving, via a management information receiving module, published management information from one or more application servers through the message broker, wherein the received published management information corresponds to a received downlink management information transmission;

the management information agent parsing, via a management information parsing module, published management information received to determine management object information, wherein the parsing is based on a predetermined management information format;

the management information agent generating a management topic based on determined management object information;

the management information agent creating and publishing, via a participation call publication module, a participation call notification about the management topic that is associated with the management object information;

a sensor/actuator agent determining a participant managed device of the management topic based on the management object information and pre-established device property information, the pre-established device property information comprising addressing and routing mechanisms of the participant managed device, wherein the participant managed device comprises an air conditioner device and the addressing and routing mechanisms of the participant managed device comprise a function including a device ID parameter and a control action parameter;

the sensor/actuator agent subscribing, via a management topic subscription module, to the management topic on behalf of the participant managed device;

the sensor/actuator agent registering the subscribed participant managed device by designating the addressing and routing mechanism of the participant managed device;

the management information agent converting, via a management information conversion module, the management information into a management instruction that can be implemented by the participant managed device;

the management information agent publishing, via a management instruction publication module, the management instruction to the management topic, wherein the management instruction comprises an air conditioning device control command; and dispensing, via the message broker, the management information to the participant managed device subscribed.

10. The computer program storage medium according to claim 9 wherein the computer executable instructions comprise:

the management information parsing module configured to parse published management information so as to determine management object information;

the participation call publication module configured to generate a management topic based on determined management object information, creates and publishes a participation call notification about the management topic that is associated with the management object information;

a participant determination module configured to determine a plurality of participant managed devices of the management topic based on the management object information and pre-established device property information; and the management topic subscription module configured to subscribe the plurality of participant managed devices to the management topic.

* * * * *